United States Patent Office 3,049,835
Patented Aug. 21, 1962

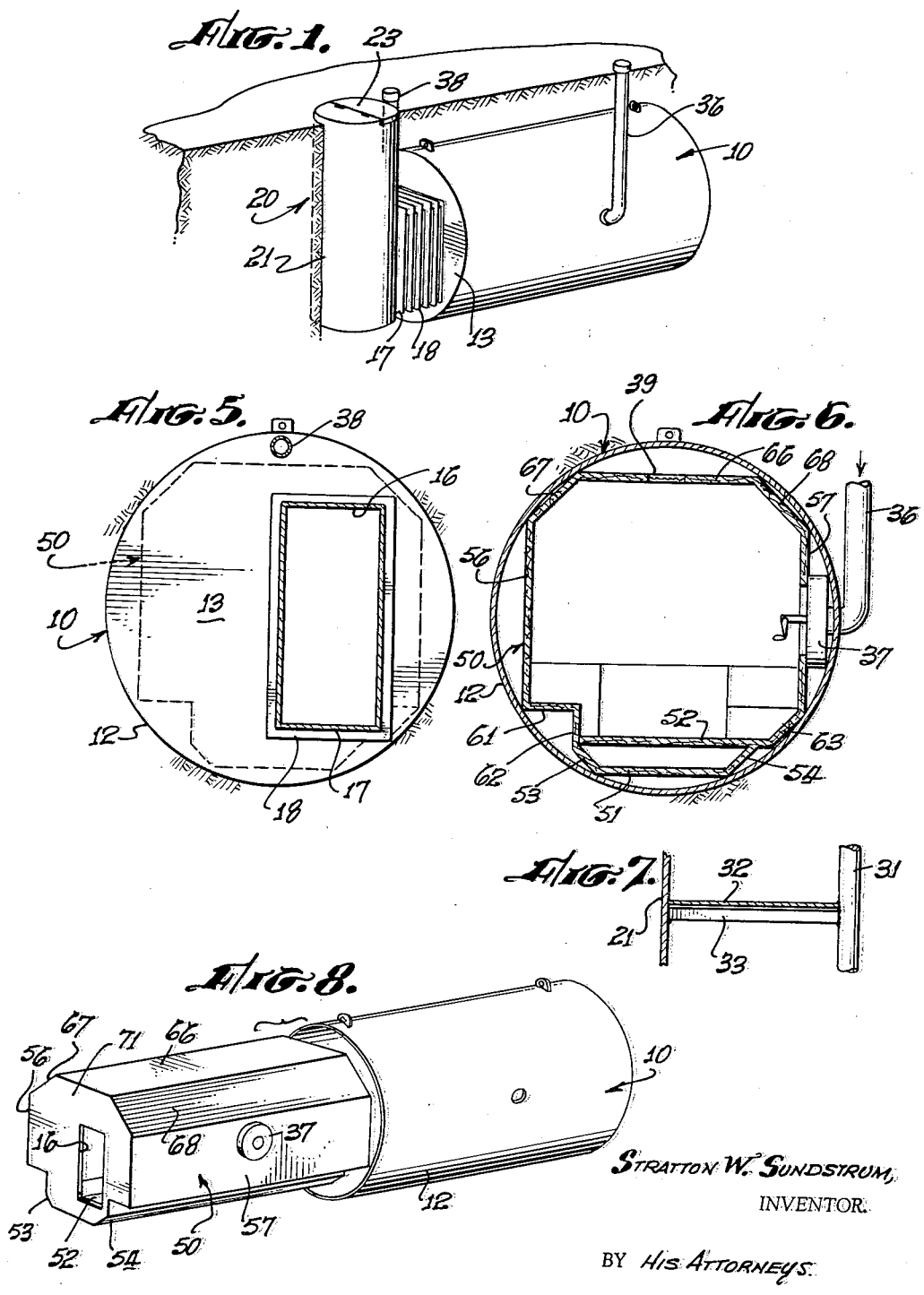

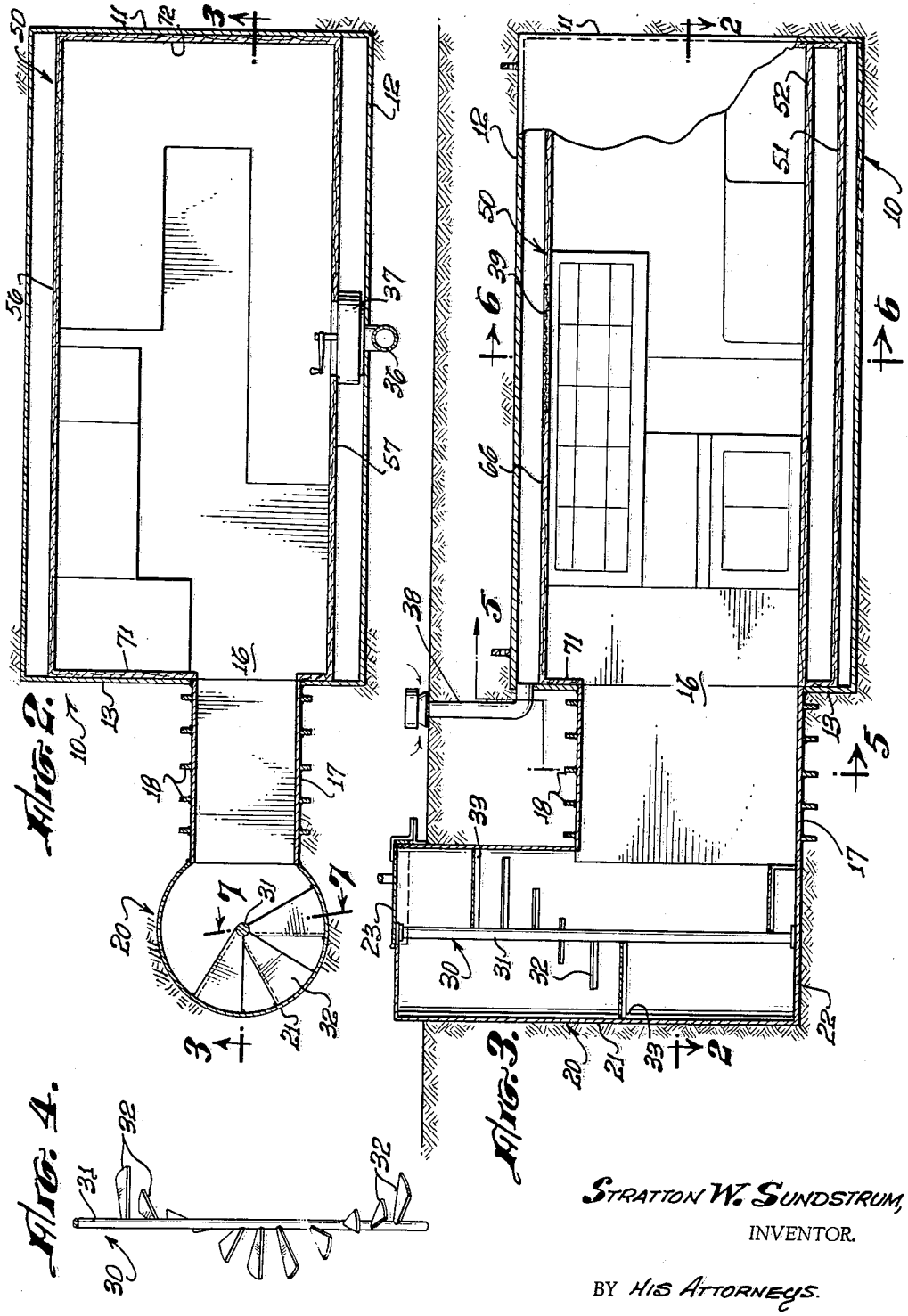

3,049,835
FALLOUT SHELTER
Stratton W. Sundstrum, Pasadena, Calif., assignor to Swan Mira-Pools, Inc., Van Nuys, Calif., a corporation of California
Filed Nov. 2, 1961, Ser. No. 149,545
7 Claims. (Cl. 50—100)

This invention relates to building structures and more particularly to an underground building structure for use as a fallout shelter.

With the advent of nuclear weapons, the design of bomb shelter structures must now take into account not only protection from shock waves and falling debris, but also protection from radiation and atmospheric contamination. Since the prior art bomb shelter type structures were designed for relatively short periods of occupancy, such as during the length of an air attack, there was little need for providing the shelters with devices utilized for the comfort and feeding of the occupants. However, the modern day fallout shelter must be designed for much longer periods of occupancy and hence must include sanitary and sleeping facilities as well as protection from contaminated atmosphere. The occupants of a fallout shelter must be prepared to continually remain within the shelter for a period of days, or even weeks, a fallout shelter literally becoming the occupants' home during that period. Although relatively large numbers of people were usually accommodated for a relatively short time in a bomb shelter, the length of occupancy of fallout shelters during and subsequent to a nuclear attack renders the concept of mass occupancy of fallout shelters relatively unfeasible. The present trend is toward single family occupancy of fallout shelters, with each family apparently expected to provide its own shelter. The most convenient and economical way to obtain a maximum degree of protection is to locate such a shelter underground. Hence, two important criteria emerge in the design of such shelters: (1) costs; and (2) available space. Therefore, the fallout shelter designed for single family occupancy should be relatively compact and inexpensive, while still containing rudimentary comforts and provisions for survival.

Accordingly, it is an object of the present invention to provide a fallout shelter structure.

It is also an object of the present invention to provide an underground fallout shelter structure.

It is another object of the present invention to provide a compact and inexpensive fallout shelter structure.

It is yet another object of the present invention to provide an easily assembled fallout shelter structure.

The objects of the present invention are accomplished by a novel structural assembly for burial underground, wherein a prefabricated housing unit is sealed within a cylindrical steel tank, access to the interior of the tank being provided by a vertical standpipe coupled to an end of the tank.

The novel features which are believed to be characteristic of the invention, both as to its organization and method of operation, together with further objects and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

In the drawing:

FIGURE 1 is a perspective view showing the present invention fallout structure installed beneath the surface of the ground;

FIGURE 2 is a view taken along the line 2—2 of FIGURE 3;

FIGURE 3 is a view taken along the line 3—3 of FIGURE 2;

FIGURE 4 is a perspective view of a compact stairway suitable for use in the present invention structure;

FIGURE 5 is a view taken along the line 5—5 of FIGURE 3;

FIGURE 6 is a view taken along the line 6—6 of FIGURE 3;

FIGURE 7 is a view taken along the line 7—7 of FIGURE 2; and

FIGURE 8 is a perspective view showing how a prefabricated housing unit is inserted into a steel tank during assembly of the present invention structure.

Referring now to FIGURE 1 of the drawing, there is shown a perspective view indicating the overall structure of the present invention fallout shelter. The basic structural unit is a cylindrical steel tank, generally indicated by the reference numeral 10, a cylindrical tank being presently preferred because of its structural rigidity and ease of fabrication from readily available large diameter sections of steel pipe. In the fabrication of the present invention structure, an end plate 11 is welded to an end of a length of cylindrical pipe casing 12 (see FIGURES 2 and 3). Into the remaining open end of the casing 12 is inserted a prefabricated housing unit, generally indicated by the reference numeral 50, as seen in FIGURE 8. The housing unit 50 can be fabricated in accordance with the well known methods of fabricating house trailers. The structural features of the housing unit 50 will be discussed in greater detail hereinbelow. The housing unit 50 is inserted into the casing 12 and abutted against the end plate 11, whereupon another end plate 13 is welded to the open end of the casing 10. The end plate 13 is provided with a rectangular aperture 16 which forms a doorway to provide access to the interior of the tank and the housing unit contained therein. Next, a section of rectangular steel casing having inside dimensions in accordance with the rectangular opening 16 is abutted against the end plate 13 in alignment with the aperture 16 and there welded into place. The rectangular casing 17 is provided with a series of steel reinforcing ribs 18.

A section of cylindrical casing 21 provides a vertical standpipe, generally indicated by the reference numeral 20 for access to the tank 19 through the rectangular casing 17. The bottom of the casing section 21 is sealed with a steel cover plate 22 while the top end of the casing 21 is provided with a hinged access lid 23. A standpipe 20 is sealed to the end of the rectangular casing 17, the casing 21 having a rectangular opening coextensive with that of the rectangular casing 17. The casing 21 has an interior diameter of about 3½ feet sufficient to accommodate a spiral stairway 30 as shown in FIGURE 4, the stairway 30 being preferably constructed of steel. The spiral stairway 30 comprises a central support pole 31 to which are fastened (preferably by welding), a series of plates 32 in the spiral orientation shown to provide a series of steps. Each of the plates 32 is in the shape of a sector of a circle having a diameter equal to the interior diameter of the casing 21, the arcuate peripheral surface of each of the plates 32 being secured to the inner peripheral surface of the casing 21 by welding. An additional measure of support is provided for each of the step plates 32 by an angle bracket 33, as shown in FIGURE 7, welded to the underside of each step plate, to the interior peripheral surface of the casing 21, and to the peripheral surface of the support pole 31.

To provide for the free circulation of air within the tank 10, an air intake pipe 36 is provided, the air intake pipe 36 extending upwardly from the central portion of the tank 10 and communicating with the interior of the prefabricated housing 50 by means of a manually operated circulating pump 37. An exhaust pipe 38 projects vertically upward from the uppermost portion of the end plate 13, the exhaust pipe 38 communicating with the interior of the tank 10 above the prefabricating housing unit 50. A suitable vent 39 is provided in the roof of the unit 50. The prefabricated housing unit 50 is of a unique exterior configuration for the purpose of insertion within the pipe section 12 comprising the body of the tank 10 while providing many points of supporting contact with the interior peripheral surface of the pipe casing 12 and maximum interior space consistent with simple construction techniques.

Referring specifically to FIGURES 6, 7 and 8 of the drawing, the structural details of the prefabricated housing unit 50 can be seen. For ease of construction, no curved panels are utilized, a series of angularly inclined straight panels being arranged to provide a polygonal cross-section for multiple supporting contact with the interior surface of the tank 10. The prefabricated housing unit 50 can be conveniently constructed of wood or other suitable material using techniques well known to those skilled in the art of constructing house trailers. Hence, the constructural features of the unit will not be discussed in great detail. In general, the unit 50 is based upon a subfloor 51 resting upon the bottom surface of the tank 10. A floor 52 is supported above the subfloor 51 by angularly inclined joists 53 and 54. Vertical wall sections 56 and 57 are supported by the subfloor 51 and the floor 52 through the use of panels 61, 62 and 63 as shown. A roof section 66 is supported above the walls 56 and 57 by joists 67 and 68, respectively.

Because of the polyhedral form of construction utilized for the prefabricated housing unit 50, many points of contact are provided for support of the unit 50 within the tank 10, nine spaced apart points of contact being provided in the illustrated embodiment as can be seen in FIGURE 6. Thus, the housing unit 50, when placed within the tank 10 is of itself of great structural rigidity, downward bearing loads being supported at five different points, namely, the intersection between the wall 56 and the panel 61, the intersection between the subfloor 51 and the joist 53, the intersection between the subfloor 51 and the joist 54, the intersection between the floor 52 and the panel 63, and the intersection between the wall 57 and the panel 63. The various panels and walls may be braced in accordance with the usual practice in the construction of house trailers. The housing unit 50 is provided with end walls 71 and 72, the end wall 71 being provided with a rectangular opening coincident with the rectangular opening in the end plate 13 of the tank 10. The length of the prefabricated housing unit 50 is coincident with the interior length of the tank 50 so the end walls 71 and 72 will abut against the end plate 13 and 11 respectively of the tank 10 to provide additional lateral support.

The interior appointments of the prefabricated housing unit 50 are a matter of choice and one particular combination of appointments is shown by the phantom lines in FIGURE 3, the various appointments being descriptively labelled.

Thus, there has been described a novel fallout shelter utilizing the unique form of assembly to provide simple and inexpensive construction. For ease of installation, the tank 10 may be partially assembled by securing the end plate 11 to the pipe section 12, the standpipe 20 being assembled to the rectangular casing 17 and including the stairway 30. The partially completed tank, the prefabricated housing unit, and the standpipe assembly may therefore be transported to the job site as discrete units, whereupon assembly is merely a matter of inserting the prefabricated housing unit 50 into the tank 10, welding the end plate 13 to the tank 10, adding the standpipe assembly by welding the end of the rectangular casing 17 to the end plate 13 and attaching the air circulating pipes 36 and 38.

Although the invention has been described with a certain degree of particularity, it is understood that the present disclosure has been made only by way of example, and that numerous changes in the details of construction and the combination and arrangement of parts may be resorted to without departing from the spirit and scope of the invention as hereinafter claimed.

What is claimed as new is:

1. A fallout shelter structure comprising, in combination:
   (a) a horizontally disposed cylindrical tank having an access opening in one end thereof;
   (b) a prefabricated housing unit disposed within said tank and longitudinally extending throughout the length thereof, said housing unit being bounded by planar wall surfaces defining a polyhedral cross-section with the lines of intersection of said planar wall surfaces being contiguous with the longitudinal interior surface of said cylindrical tank, said housing unit having an access opening in one end thereof coextensive with the access opening in said one end of said cylindrical tank, the interior of said housing unit being fitted with predetermined appointments; and
   (c) a generally vertically extending cylindrical casing having a sealed bottom end and a top end with a selectively sealable portion, said cylindrical casing defining an access opening in the peripheral surface near the bottom end thereof, said cylindrical casing being mounted to said one end of said tank by horizontally extending coupling means having one end encompassing said access opening in said tank and the other end encompassing said access opening in said cylindrical casing to thereby place the interior of said housing unit in communication with the lower interior portion of said cylindrical casing, said cylindrical casing being of a predetermined length whereby said fallout shelter may be buried with only said top end of said cylindrical casing exposed above the surface of the earth.

2. A fallout shelter structure comprising, in combination:
   (a) a horizontally disposed cylindrical tank having an access opening in one end thereof;
   (b) a prefabricated housing unit disposed within said tank and longitudinally extending throughout the length thereof, said housing unit being bounded by a plurality of planar wall surfaces defining a polyhedral cross-section with the lines of intersection of said planar wall surfaces being contiguous with the longitudinal interior surface of said cylindrical tank and with at least four of said lines of intersection providing support from said tank for downward bearing loads upon said housing unit, said housing unit having an access opening in one end thereof coextensive with the access opening in said one end of said cylindrical tank, the interior of said housing unit being fitted with predetermined appointments; and
   (c) a generally vertically extending cylindrical casing having a sealed bottom end and a top end with a selectively sealable portion, said cylindrical casing defining an access opening in the peripheral surface thereof near the bottom end thereof, said cylindrical casing being mounted to said one end of said tank by horizontally extending coupling means having one end encompassing said access opening in said tank and the other end encompassing said access opening in said cylindrical casing to thereby place the interior of said housing unit in communication with the lower interior portion of said cylindrical casing, said cylindrical casing being of a predetermined length whereby said fallout shelter may be buried with only said top end of said cylindrical casing exposed above the surface of the earth.

3. A fallout shelter structure comprising, in combination:

(a) a horizontally disposed cylindrical tank having an access opening in one end thereof;

(b) a prefabricated housing unit disposed within said tank and longitudinally extending throughout the length thereof, said housing unit being bounded by planar wall surfaces defining a polyhedral cross section with the lines of intersection of said planar wall surfaces being contiguous with the longitudinal interior surface of said cylindrical tank, said housing unit having an access opening in one end thereof coextensive with the access opening in said one end of said cylindrical tank, the interior of said housing unit being fitted with predetermined appointments; and (c) a generally vertically extending cylindrical casing having a circular cross-section of a predetermined diameter, said cylindrical casing having a sealed bottom end and a top end with a selectively sealable portion, said cylindrical casing defining an access opening in the peripheral surface thereof near the bottom end thereof, said cylindrical casing being mounted to said one end of said tank by horizontally extending tubular coupling means having one end encompassing said access opening in said tank and the other end encompassing said access opening in said cylindrical casing to thereby place the interior of said housing unit in communication with the lower interior portion of said cylindrical casing, said cylindrical casing being of a predetermined length whereby said cylindrical tank may be buried with only the top end of said cylindrical casing exposed above the surface of the earth, said cylindrical casing including ladder means extending from said selectively sealable portion of said top end to said bottom end.

4. A fallout shelter structure comprising, in combination:

(a) a horizontally disposed cylindrical tank having an access opening in one end thereof;

(b) a prefabricated housing unit disposed within said tank and longitudinally extending throughout the length thereof, said housing unit being bounded by planar wall surfaces defining a polyhedral cross-section with the lines of intersection of said planar wall surfaces being contiguous with the longitudinal interior surface of said cylindrical tank, said housing unit having an access opening in one end thereof coextensive with the access opening in said one end of said cylindrical tank, the interior of said housing unit being fitted with predetermined appointments;

(c) a generally vertically extending cylindrical casing having a circular cross-section of a predetermined diameter, said cylindrical casing having a sealed bottom end and a top end with a selectively sealable portion, said cylindrical casing defining an access opening in the peripheral surface thereof extending near the bottom end thereof, said cylindrical casing being mounted to said one end of said tank by horizontally extending tubular coupling means having one end encompassing said access opening in said tank and the other end encompassing said access opening in said cylindrical casing to thereby place the interior of said housing unit in communication with the lower interior portion of said cylindrical casing, said cylindrical casing being of a predetermined length whereby said fallout shelter may be buried with only said top end of said cylindrical casing exposed above the surface of the earth;

(d) a support pole coaxially mounted within said casing and extending between said top and bottom ends thereof; and (e) a plurality of step plates secured to said support pole and to the interior peripheral surface of said cylindrical casing and extending horizontally therebetween in spaced helical alignment around said support pole from the bottom thereof a predetermined distance upward, each of said plates being in the shape of a sector of a circle of said predetermined diameter with the arcuate surface of each sector contiguous with the interior peripheral surface of said casing and with the apex of each sector contiguous with said support pole.

5. A fallout shelter structure comprising, in combination:

(a) a horizontally disposed cylindrical tank having an access opening in one end thereof;

(b) a prefabricated housing unit disposed within said tank and longitudinally extending throughout the length thereof, said housing unit being bounded by planar wall surfaces defining a polyhedral cross-section with the lines of intersection of said planar wall surfaces being contiguous with the longitudinal interior surface of said cylindrical tank, said housing unit having an access opening in one end thereof coextensive with the access opening in said one end of said cylindrical tank, the interior of said housing unit being fitted with predetermined appointments;

(c) a generally vertically extending cylindrical casing having a circular cross-section of a predetermined diameter, said cylindrical casing having a sealed bottom end and a top end with a selectively sealable portion, said cylindrical casing defining an access opening in the peripheral surface thereof near the bottom end thereof, said cylindrical casing being mounted to said one end of said tank by horizontally extending tubular coupling means having one end encompassing said access opening in said tank and the other encompassing said access opening in said cylindrical casing to thereby place the interior of said housing unit in communication with the lower interior portion of said cylindrical casing, said cylindrical casing being of a predetermined length whereby said fallout shelter may be buried with only said top end of said cylindrical casing exposed above the surface of the earth;

(d) a support pole coaxially mounted within said casing and extending between said top and bottom ends thereof; and (e) A plurality of step plates secured to said support pole and to the interior peripheral surface of said cylindrical casing and extending horizontally therebetween in spaced helical alignment around said support pole from the bottom thereof a predetermined distance upward, each of said plates being in the shape of a sector of a circle of said predetermined diameter with the arcuate surface of each sector contiguous with the interior peripheral surface of said casing and with the apex of each section contiguous with said support pole.

6. A fallout shelter structure comprising, in combination:

(a) a horizontally disposed cylindrical tank having a first opening in one end thereof and second and third openings in the peripheral surface thereof;

(b) a prefabricated housing unit disposed within said tank and longitudinally extending throughout the length thereof, said housing unit being bounded by at least eight planar wall surfaces defining a polyhedral cross-section with the lines of intersection of said planar wall surfaces being contiguous with the longitudinal interior surface of said cylindrical tank and with at least four of said lines of intersection contacting the interior peripheral surface of said tank to provide support from said tank for downward bearing loads upon said housing unit, said housing unit having a first opening in one end thereof coextensive with the first opening in said one end of said cylindrical tank, said housing unit having second and third openings in the planar wall surfaces thereof, the interior of said housing unit being fitted with predetermined appointments;

(c) air circulating means mounted to said prefabricated housing unit and communicating with said second opening in said cylindrical tank and said second opening in the planar wall surface of said housing unit for the passage of air therebetween;

(d) a vertically extending air intake standpipe having its lower end communicating with said second opening in said cylindrical tank, said air intake pipe projecting above said cylindrical tank greater than a predetermined distance;

(e) a vertically extending air exhaust standpipe having its lower end in communcation with said third opening in said cylindrical tank, said air exhaust standpipe projecting above said cylindrical tank greater than said predetermined distance; and (f) a generally vertically extending cylindrical casing having a sealed bottom end and a top end with a selectively sealable portion, said cylindrical casing defining an access opening in the peripheral surface thereof near the bottom end thereof, said cylindrical casing being mounted to said one end of said tank by horizontally extending tubular coupling means having one end encompassing said first opening in said tank and the other end encompassing said first opening in said cylindrical casing to thereby place the interior of said housing unit in communication with the lower interior portion of said cylindrical casing, said cylindrical casing being of a predetermined length to project above said cylindrical tank greater than said predetermined distance whereby said cylindrical tank may be buried with only the top ends of said cylindrical casing and said air intake and air exhaust standpipes exposed above the surface of the earth.

7. A fallout shelter structure comprising, in combination:

(a) a horizontally disposed cylindrical tank having a first opening in one end thereof and second and third openings in the peripheral surface thereof;

(b) a prefabricated housing unit disposed within said tank and longitudinally extending throughout the length thereof, said housing unit being bounded by at least eight planar wall surfaces defining a polyhedral cross-section with the lines of intersection of said planar wall surfaces being contiguous with the longitudinal interior surface of said cylindrical tank and with at least four of said lines of intersection contacting the interior peripheral surface of said tank to provide support from said tank for downward bearing loads upon said housing unit, said housing unit having a first opening in one end thereof coextensive with the first opening in said one end of said cylindrical tank, said housing unit having second and third openings in the planar wall surfaces thereof, the interior of said housing unit being fitted with predetermined appointments;

(c) air circulating means mounted to said prefabricated housing unit and communicating with said second opening in said cylindrical tank and said second opening in the planar wall surface of said housing unit for the passage of air therebetween;

(d) a vertically extending air intake standpipe having its lower end communicating with said second opening in said cylindrical tank, said air intake pipe projecting above said cylindrical tank greater than a predetermined distance;

(e) a vertically extending air exhaust standpipe having its lower end in communication with said third opening in said cylindrical tank, said air exhaust standpipe projecting above said cylindrical tank greater than said predetermined distance;

(f) a generally vertically extending cylindrical casing having a circular cross-section of a predetermined diameter, said cylindrical casing having a sealed bottom end and a top end with a selectively sealable portion, said cylindrical casing defining an access opening in the peripheral surface thereof near the bottom end thereof, said cylindrical casing being mounted to said one end of said tank by horizontally extending tubular coupling means having one end encompassing said first opening in said tank and the other end encompassing said first opening in said cylindrical casing to thereby place the interior of said housing unit in communication with the lower interior portion of said cylindrical casing, said cylindrical casing being of a predetermined length to project above said cylindrical tank greater than said predetermined distance whereby said cylindrical tank may be buried with only the top ends of said cylindrical casing and said air intake and air exhaust standpipes exposed above the surface of the earth;

(g) a support pole coaxially mounted within said casing and extending between said top and bottom ends thereof; and (h) a plurality of step plates secured to said support pole and to the interior peripheral surface of said cylindrical casing and extending horizontally therebetween in spaced helical alignment around said support pole from the bottom thereof a predetermined distance upward, each of said plates being in the shape of a sector of a circle of said predetermined diameter with the arcuate surface of each sector contiguous with the interior peripheral surface of said casing and with the apex of each sector contiguous with said support pole.

No references cited.